Aug. 16, 1966     V. V. ABAJIAN ETAL     3,266,318
THERMOSENSITIVE DEVICE FOR TEMPERATURE INDICATION
AND/OR CONTROL
Filed April 3, 1963
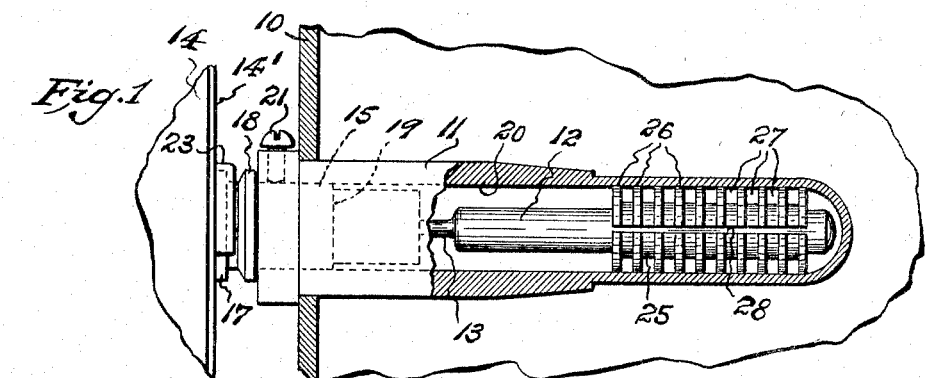
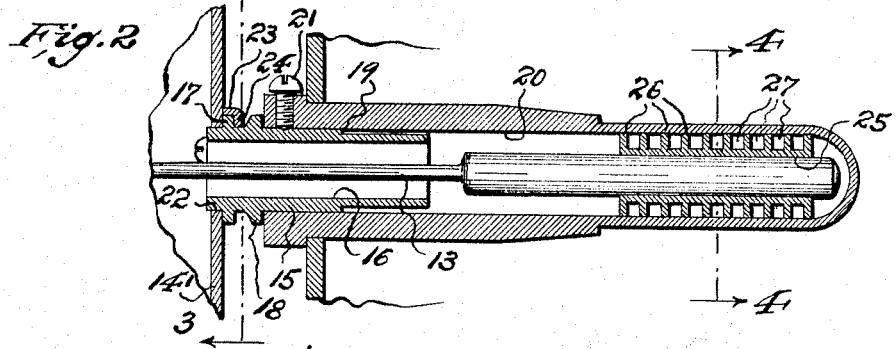
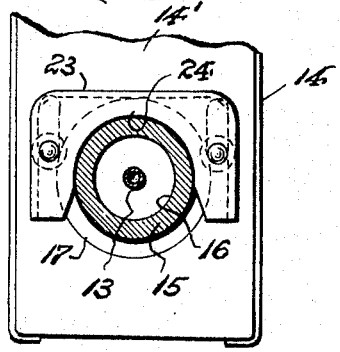
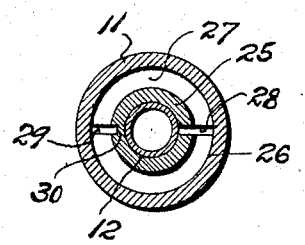
INVENTORS —
Vincent V. Abajian &
BY Richard Abajian
Richards & Cifelli,
Attorneys —

United States Patent Office 3,266,318
Patented August 16, 1966

3,266,318
THERMOSENSITIVE DEVICE FOR TEMPERATURE INDICATION AND/OR CONTROL
Vincent V. Abajian, 52 Evergreen Drive, North Caldwell, N.J., and Richard Abajian, 289 W. Stevens Ave., Wyckoff, N.J.
Filed Apr. 3, 1963, Ser. No. 270,244
6 Claims. (Cl. 73—368)

This invention relates to improvements in thermosensitive devices used to indicate and/or control the temperatures of heated fluids contained in a boiler tank or other container; the device including an inwardly closed and outwardly open socket or well which is affixed to a wall of the container so as to extend into the container interior, and a bulb adapted to be removably entered and enclosed within said well, said bulb containing a medium adapted to expand and contract under the effect of varying temperatures, and being cooperative with suitable temperature indicating and/or control means adapted to be activated by temperature response reaction thereto.

In thermosensitive devices, such as above referred to, it is usual that the external diameter of the well be in excess of the internal diameter of a bulb entered therein, this being desirable whereby to facilitate removal of the bulb from the well as may be necessary for replacement or other reasons. Due to this, since intervening air between the well wall and the bulb is a poor heat conductor, there is undesirable lag in transfer of heat from the fluid tested from the wall of the well to the bulb, as well as circulation of outside air to and from the space between the well wall and bulb, which results in undesirable sluggish reaction and operation of the bulb.

Having the above in view, it is an object of this invention to provide novel air-circulation-inhibiting means adapted to be inserted between the walls of the well and the bulb, whereby more direct and rapid transfer of heat from the former to the latter is assured by radiation and conduction.

Another object of this invention is to provide a novel air-circulation-inhibiting heat transfer means intermediate the well walls and the bulb which comprises a longitudinally split heat transfer sleeve produced from a good heat conductive metal, such e.g. as aluminum, that is adapted to embrace the bulb; said sleeve being provided with a plurality of longitudinally spaced apart radial fins to extend therefrom to the well walls, thereby to provide direct heat conductive paths between the latter and the bulb, and so that spaces between said fins are adapted to trap intervening air subject to temperature rise, whereby heat is further transferred to the bulb by conduction.

A further object of this invention is to provide the heat transfer sleeve, along a side thereof diametrically opposite its split side, with a weakened portion, whereby the sleeve and its fins can more or less flexibly adjust itself for operative interengaging disposition relative to and between the well walls and the bulb.

A still further object of this invention is to provide a novel adapter or coupling member operative to detachably connect the bulb, and the temperature indicating and/or control means served thereby, to the well.

Other objects of this invention, not at this time more particularly mentioned, will be understood from a reading of the following description thereof in connection with the accompanying drawings illustrative of an embodiment thereof, in which drawings:

FIG. 1 is a side elevational view, in part section, showing the termosensitive device according to this invention; and FIG. 2 is a longitudinal sectional view thereof.

FIG. 3 is a cross-sectional view, taken on line 3—3 in FIG. 2, but drawn on an enlarged scale; and
FIG. 4 is another cross-sectional view, taken on line 4—4 in FIG. 2, and also drawn on an enlarged scale.

Like characters of reference are employed in the above described views, to indicate corresponding parts.

Referring to said drawings, the reference character 10 indicates a wall of a boiler, tank or other container in which a fluid to be tested is contained. Suitably affixed to said wall 10, to extend therethrough into the container, in contact with the fluid to be tested, is an inwardly closed and outwardly open well or casing 11.

Inserted through the outer open end of the well 11 into the well interior, so as to be enclosed with said well, is a thermometric bulb 12, from the outer end of which extends a capillary tube 13. Said tube 13 is entered in a temperature indicating and/or control means 14 for activating cooperation therewith, in manner well known to the art.

A novel adapter or coupling member is provided to detachably connect the temperature indicating and/or control means 14, with its associated bulb 12, to the outer end of the well 11. This adapter or coupling member comprises a tubular barrel 15, through the open ended axial passage 16 of which the bulb 12 can be entered in or withdrawn from the interior of the well 11. Spaced inwardly from the outer end of the barrel 15 is an external radial coupling flange 17, and suitably spaced inwardly from the latter is an external radial stop flange 18. Beyond said stop flange 18, the barrel 15 is formed to provide an attachment portion 19, adapted to be telescopically entered into the outwardly open end of the well bore 20, said attachment portion being diametrically sized to fit said well bore. If desired, the attachment portion 19 may be stepped (as shown) to provide different external diameters to correspond to different diametric sizes of well bores 20, whereby the adapter or coupling member can be selectively fitted to various well sizes. After the attachment portion 19 is entered into the well as described, it may be releasably secured to the latter by suitable means such e.g. as by a set screw 21 with which the outer end of the well is provided.

Means is provided for attaching the outer end of the adapter or coupling member in operative connection with the temperature indicating and/or control means 14, with the capillary tube 13 of the well housed bulb 12 operatively entered in the latter. To this end, a face wall 14' of the temperature indicating and/or control means is provided with an opening 22, through which can be inserted the outer end of the adapter barrel 15, until said barrel is stopped by abutment of its coupling flange 17 against the outer surface of said face wall 14'. Mounted on said face wall 14', in slidable relation to its outer surface, is a clamp member 23 having an offset semicircular clamp flange 24, which, upon movement of said clamp member toward the adapter or coupling member, will straddle the adapter barrel 15 so as to engage over and behind the coupling flange 17, thus releasably clamping the outer end of the adapter or coupling member in affixed connection with the temperature indicating and/or control means 14, thereby assembling together the latter, the well 11 and bulb 12 in operative relation.

The principal feature of this invention is the provision of a novel air-circulation-inhibiting and heat transfer means, which is adapted to be interposed between the bulb 12 and the walls of the well 11 within which said bulb is enclosed; especially when the internal diameter of the well substantially exceeds the external diameter of the bulb, resulting in a substantial area of clearance space therebetween. This heat transfer means comprises a sleeve 25 produced from a good heat conductive material, preferably a metal such as aluminum. This sleeve 25 is provided with a multiplicity of longitudinally spaced apart external transverse radial fins 26. The O.D. of these fins approximate the I.D. of the well 11, and the I.D. of the sleeve 25 approximates the O.D. of the bulb 12. The spaced apart fins 26 form air trapping space or cells 27 therebetween and the outermost fin serves to inhibit circulation of air from the outside along the space between the tube 13 and the attachment portion 19. The sleeve and its fins are longitudinally split to provide a gap 28 extending from end to end thereof, thus dividing the sleeve and its fins into somewhat flexible and relatively movable semi-circular sections. Diametrically opposite the split or gap 28, the sleeve and its fins are inducted by a slot 29, the bottom of which terminates within the thickness of the sleeve wall, so as to provide the latter with a somewhat weakened portion 30, adapted to form a flexible hinging connection between the relatively movable sections of the sleeve and its fins, thus allowing the heat transfer means to expand and contract, whereby to facilitate adjustment thereof in interengaging disposition relative to and between the bulb and well walls.

In use, when this heat transfer means is operatively interposed and interengaged between the walls of the well 11 and the thermometric bulb 12, heat is effectively, directly and rapidly conducted from the former to the latter with minimum loss. In addition to this, the air trapped between the fins 26 in the intervening spaces or cells 27 is quickly elevated in temperature, so that heat is additionally transferred to the bulb 12 by convection. It will thus be obvious that interference and reduction of heat transfer from the well walls to the bulb by interposed air in the clearance space therebetween, resulting in sluggish bulb reaction, is substantially overcome, and a more assured and rapid transfer of heat from the fluid tested to the responsive bulb is assured by radiation as well as by conduction and convection.

To assemble the elements of the thermosensitive device according to this invention in operative condition, the adapter or coupling member is clamped to the temperature indicating and/or control means 14 as above described, with the bulb 12 passed outwardly through the passage 16 of the adapter or coupling member, to project externally therefrom. The bulb 12 being thus exposed, the sleeve 25 of the heat transfer means is slid over and onto said bulb. After this, the assembled heat transfer means and bulb is inserted into the interior of the well 11, and the outer end of the adapter or coupling member is thereupon entered into the outer end of the well, whereupon the former is detachably secured to the latter by tightening home the set screw 21. The heat transfer means is now operatively interengaged between the bulb and the walls of the well, and the assembled thermosensitive device is set up in functioning condition.

Having now described our invention, we claim:

1. A thermosensitive device comprising a thermometric bulb, an outwardly opening well to normally enclose said bulb and adapted to have a closed inner end portion immersed in a fluid to be tested, the interior diameter of said well substantially exceeding the exterior diameter of the bulb, and a heat transfer means of good conductivity interposed between the bulb and the walls of the well, said means comprising a sleeve adapted to embrace the bulb and having a multiplicity of longitudinally spaced apart transverse radial fins extending therefrom toward the walls of the well, so as to inhibit the circulation of air from the open end of the well and provide heat conductive paths leading to the bulb from said walls, and said thus spaced apart fins also providing intervening air trapping cells whereby heat is further transmitted through the trapped air to the bulb.

2. In a thermosensitive device according to claim 1, wherein the sleeve and its fins are longitudinally split from end to end, thereby to provide a gap dividing the same into somewhat flexible semi-circular sections adapted to allow transverse expansion and contraction thereof, whereby to facilitate adjustment of the heat transfer means in interengaging disposition relative to and between the bulb and well walls.

3. In a thermosensitive device according to claim 2, wherein the sleeve and its fins, at the side thereof opposite said split gap, is indented by a slot terminating within the wall of the sleeve, thereby to provide the latter with a weakened hinging portion intermediate its semi-circular sections.

4. A thermosensitive device comprising a thermometric bulb having a capillary tube, a temperature indicating means by which said bulb and capillary tube is served, an outwardly opening well with an inner closed end portion adapted to be immersed in a fluid to be tested, said bulb being normally enclosed within said well, the interior diameter of said well substantially exceeding the exterior diameter of the bulb, an adapter, means to connect one end of the adapter with said temperature responsive means, the opposite end of the adapter being entered in the open end of the well and suitably detachably secured thereto, and a heat transfer means of good conductivity interposed between the bulb and the walls of the well, said means comprising a sleeve adapted to embrace the bulb and having a multiplicity of longitudinally spaced apart transverse radial fins extending therefrom toward the walls of the well so as to inhibit the circulation of outside air to and from the space between the bulb and the well walls and provide heat conductive paths leading to the bulb from said walls, and said thus spaced apart fins providing intervening air trapping cells whereby heat is further transmitted through the trapped air to the bulb.

5. In a thermosensitive device according to claim 4, wherein the sleeve and its fins are longitudinally split from end to end, thereby to provide a gap dividing the same into somewhat flexible semi-circular sections adapted to allow transverse expansion and contraction thereof, whereby to facilitate adjustment of the heat transfer means in interengaging disposition relative to and between the bulb and well walls.

6. In a thermosensitive device according to claim 5, wherein the sleeve and its fins, at the side thereof opposite said split gap, is indented by a slot terminating within the wall of the sleeve, thereby to provide the latter with a weakened hinging portion intermediate its semi-circular sections.

References Cited by the Examiner

UNITED STATES PATENTS

| | | | |
|---|---|---|---|
| 1,605,057 | 11/1926 | Nichols | 73—362.8 |
| 2,135,078 | 11/1938 | Hubbard. | |
| 2,156,826 | 5/1939 | Ullman | 73—362.8 |

LOUIS R. PRINCE, *Primary Examiner.*

J. RENJILIAN, *Assistant Examiner.*